Figure 4:
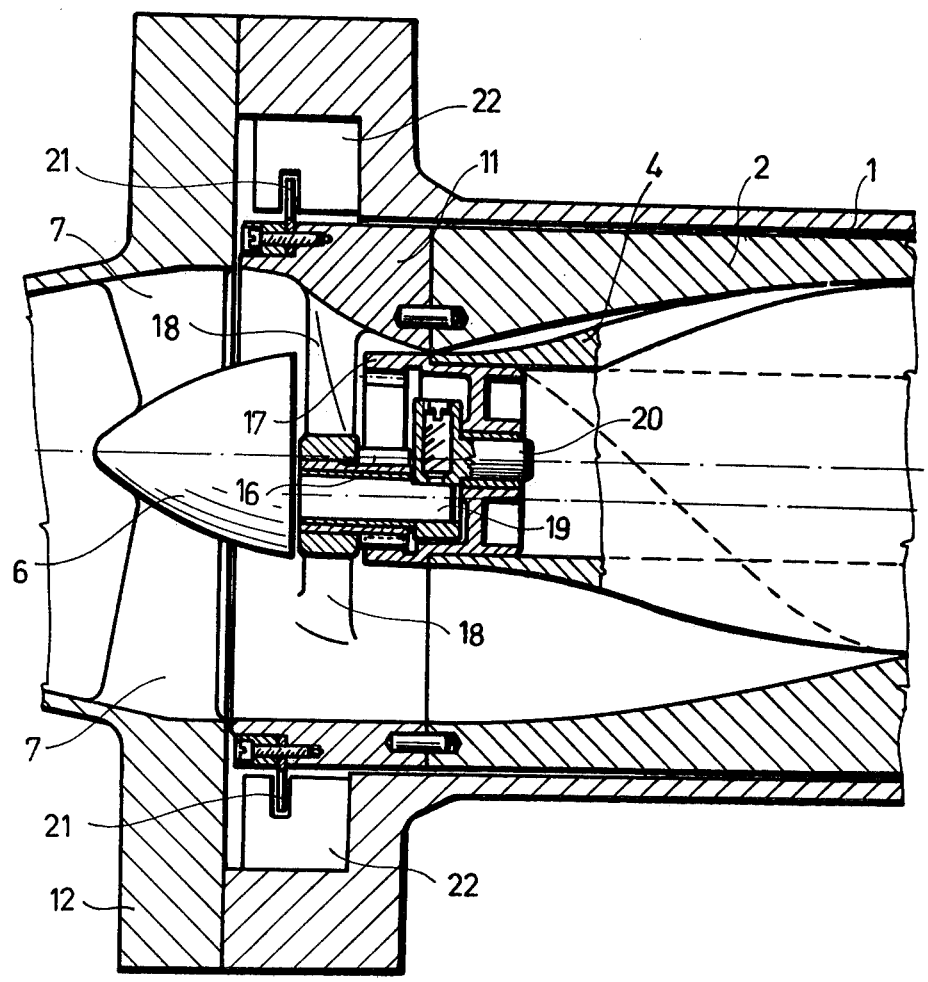

United States Patent [19]

Nátkai et al.

[11] Patent Number: 4,482,305

[45] Date of Patent: Nov. 13, 1984

[54] AXIAL FLOW APPARATUS WITH ROTATING HELICAL CHAMBER AND SPINDLE MEMBERS

[75] Inventors: Lájos Nátkai; Elek Ujfelusi, both of Budapest, Hungary

[73] Assignee: Országos Köolaj és Gázipari Tröszt, Budapest, Hungary

[21] Appl. No.: 565,848

[22] Filed: Dec. 29, 1983

Related U.S. Application Data

[63] Continuation of Ser. No. 350,050, Feb. 18, 1982, abandoned, which is a continuation of Ser. No. 185,131, Sep. 8, 1980, abandoned, which is a continuation of Ser. No. 970,321, Dec. 18, 1978, abandoned.

[30] Foreign Application Priority Data

Dec. 28, 1977 [HU] Hungary .......................... OA 583

[51] Int. Cl.³ .......................................... F01C 1/107
[52] U.S. Cl. .................................... 418/48; 418/150; 418/166
[58] Field of Search ................. 418/48, 150, 166; 415/142

[56] References Cited

U.S. PATENT DOCUMENTS

| Re. 17,648 | 4/1930 | Schmidt | 415/142 |
| 1,892,217 | 12/1932 | Moineau | 418/48 |
| 3,168,049 | 2/1965 | Taylor et al. | 418/166 |
| 3,512,904 | 5/1970 | Allen | 418/48 |
| 3,938,915 | 2/1976 | Olofsson | 418/48 |

FOREIGN PATENT DOCUMENTS

| 85331 | 1/1936 | Sweden | 418/48 |
| 427475 | 4/1935 | United Kingdom | 418/48 |

Primary Examiner—John J. Vrablik
Attorney, Agent, or Firm—Gabriel P. Katona

[57] ABSTRACT

A multi-purpose flow apparatus of the type which operates on the principle of volumetric displacement, has an internally helicoidal chamber rotatable about its center of gravity and having one of a constant or variable pitch and $z_k$ thread starts and an externally helicoidal spindle rotatable about an axis disposed at its center of gravity. The spindle has $z_o = z_k + 1$ thread starts, the thread division thereof is $z_o/z_k$ times the pitch of the chamber and the angular velocity of rotation of the spindle is $z_k/z_o$ times that of the chamber.

5 Claims, 7 Drawing Figures

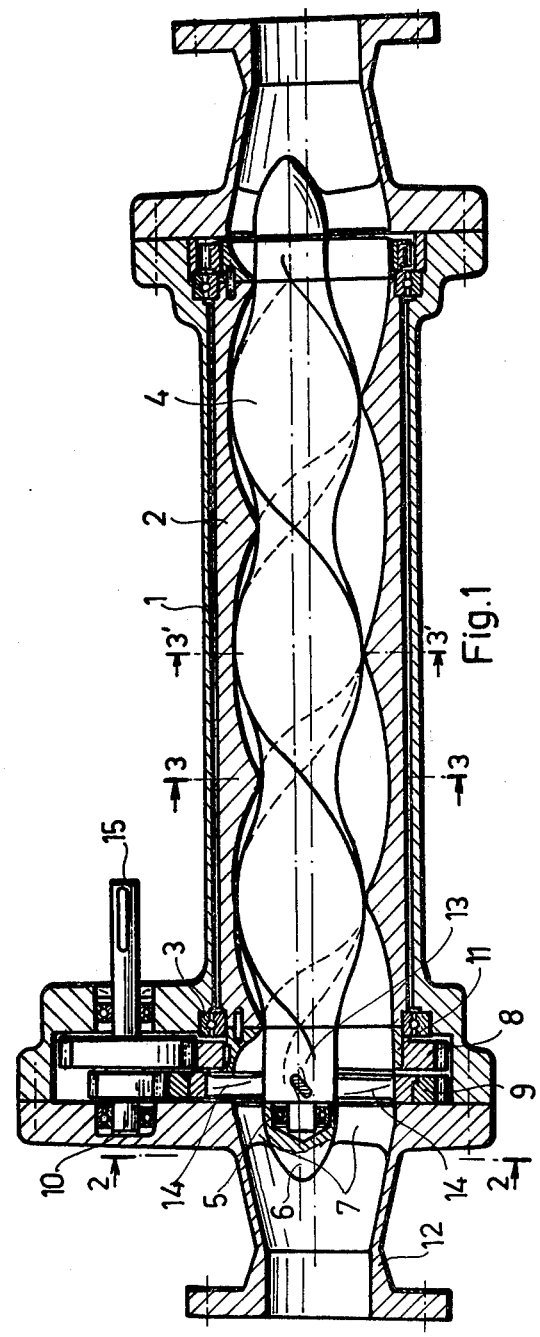
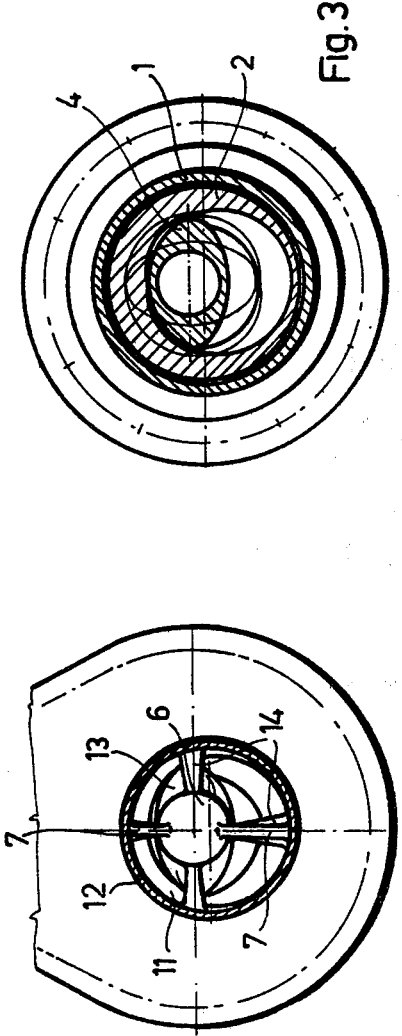

AXIAL FLOW APPARATUS WITH ROTATING HELICAL CHAMBER AND SPINDLE MEMBERS

This is a continuation of application Ser. No. 350,050, filed Feb. 18, 1982, which is a continuation of Ser. No. 185,131, filed Sept. 8, 1980, which is a continuation of Ser. No. 970,321, filed Dec. 18, 1978, all abandoned.

The invention relates to such axial flowing flow equipment, which operates on the principle of the volumetric displacement and can be utilized as motor, machine or flow-meter. It transform the energy of flowing liquid and gas into mechanical work or increases the working capacity of the flowing medium with the help of mechanical work applied for its driving. The speed of the rotation or the angular velocity of the rotating elements is over proportional to the velocity of flowing medium in consequence of the static and dynamic balancing of the rotating parts, further the total enforcement of the volumetric principle, therefore the equipment according to the invention is specially suitable for the measuring of liquid and gas with great precision.

The well-known devices with similar purpose—those, which operate on the principle of the volumetric displacement—work usually with great frictional loss, the flowing medium is strained to vortex, directional breaking acceleration and the solving of its volumetric delimitation is complicated, the volumetric principle can be realized generally only with concessions and imperfectly.

The devices, which operate on the principle of flowing technique, work economically only in certain working circumstances its efficiency depend on the flow-velocity, respectivly the speed of rotation.

The property of the devices with volumetric displacement and flowing technique produce expressive mechanical, hydraulic and volumetric loss.

The object of the flowing equipment according to the invention is, the increase of the efficiency at the transforming of the kinetic and potential energy of the flowing liquid and gas into mechanic work or at the transferring of the mechanic work into kinetic and potential energy with the avoidance of mistakes of the well-known devices and the assurance of a good ratio of the flowing medium volume to the speed of rotation of equipment in the total operating range.

The equipment—according to the invention—includes an internal helicoidal tubular member forming a chamber in pressure-tight casing with a bearing support parallel to the flowing direction; in the chamber setted and with it connected external helicoidal spindle with another parallel axis supported bearing; another part of the equipment is the rotary movement translator means suitable for the mechanical work (favourably gear with axis), or an equipment, with registers the rotation, (favourably an impulse marker) and if it is necessary a rotary movement translator means, which guarantees the separate interlocking between the chamber and the spindle (favourably gear drive).

The internal section of the transverse profile of the chamber is an epioycloid $z_k$ or two circular arcs, connected with two parallel straight lines, the internal envelope of the surface forms the external section of the transverse profile spindle. It is that surface, which arises from the relative movement by the section of the dependent chamber.

If the arc-number of the cycloids is a course-start, the external helicoidal spindle with comfortable course and with start $z_0 = z_k + 1$ and constant or variable pitch $h_0 = (z_0/z_k) \cdot h_k$, seats to the internal helicoidal chamber with thread starts $z_k$ and constant or variable $h_k$ pitch of the chamber; the external helicoidal spindle with comfortable course, circular-section, with stingle thread and constant or variable $h_0 = 0.5 \, h_k$ pitch seats to the internal helicoidal chamber, with a section consisting of two circular arcs, connected with two parallel straight lines, with double thread and constant or variable $h_k$ pitch. The chamber and the spindle are connected by the profile of the transverse sections, which are on the same level, but a separate interlocking can be built for the increase of the transportable moment by a rotation translator means, with a modification $i = z_0/z_k$, or $i = 0.5$ and a synonymous rotation. Both the chamber holding pivot or shaft bearing, and the spindle holding pivot or shaft bearing is connected rigidly to the pressure-tight casing of the equipment.

The transverse sections of the single thread chamber—which can be formed with the value $z_k = 1$—and of the spindle, which can be joined to this/to the chamber—with start $z_0 = z_k + 1 = 2$—are closed according to the Hungarian invention No. 152 615, with the difference, that at the above-mentioned invention the epicycloid—which limits the section of the chamber from inside—is broken because of the tangential flow.

In another alternative of the equipment according to the invention the double thread chamber and the transverse sections/being at the same level/of the single thread spindle can be joined and are connected as the other known pump-equipment.

The transverse section of the spindle is a ring and the transverse section of the chamber is a two circular arc—which are connected with two parallel straight lines where the length of the connecting straight lines is equal with the relative displacement of the circular section of the spindle.

In consequence of the helicoidal surface-formation of the chamber and spindle among the flats—which are spaced from one another by distance $d_1$—the chamber-sections deviate with angle $d_\phi$ the spindle-sections deviate with angle $z_k/z_0 \times d_\phi$.

For this reason the chamber-section and the spindle-section deviate together with angle$/1 - (z_k/z^0)/d_\phi$ along the length $d_1$. In consequence of the relative torsion of the sections between the chamber and the spindle in accordance with the constant or variable pitch closed volume-parts holes—with equal or different length—remains for the transportation of the flowing liquid or gas-medium. These volume-parts are repeated in consequence of the torsion of the chamber and the spindle interweaved, but spaced from one another continually limited constant or continuously variable distance in the same phase.

It is necessary to plan the chamber and the spindle longer than the said closed volume-part for the sake of the inlet and outlet side of the equipment according to the invention. In this case theoretically the medium cannot be flowed through in the home position of the chamber and spindle.

In the equipment according to the invention in operation the chamber rotates with turn $n_k$, and the spindle rotates with turn $n_o = (z_k/z^o) \cdot n_k$ in consequence of the modification of the interlocking, or of the separate rotation transfer means, while the volume-part delivered medium progresses in axis-direction, without rotation, without deformation and volume change or with deformation and volume-change, constant velocity $v = n_k \cdot k_K = n_o \cdot k_o$, or variable velocity.

The equipment according to the invention has no member, which makes an oscillating movement.

The multiple—start chamber and spindle rotate in consequence of the symmetry of sections about a proper centre of gravity-axis and it is necessary to compensate the single thread chamber and spindle dynamically suitable for the centre of gravity.

The equipment according to the invention is made known on the following figures.

Figure 5:
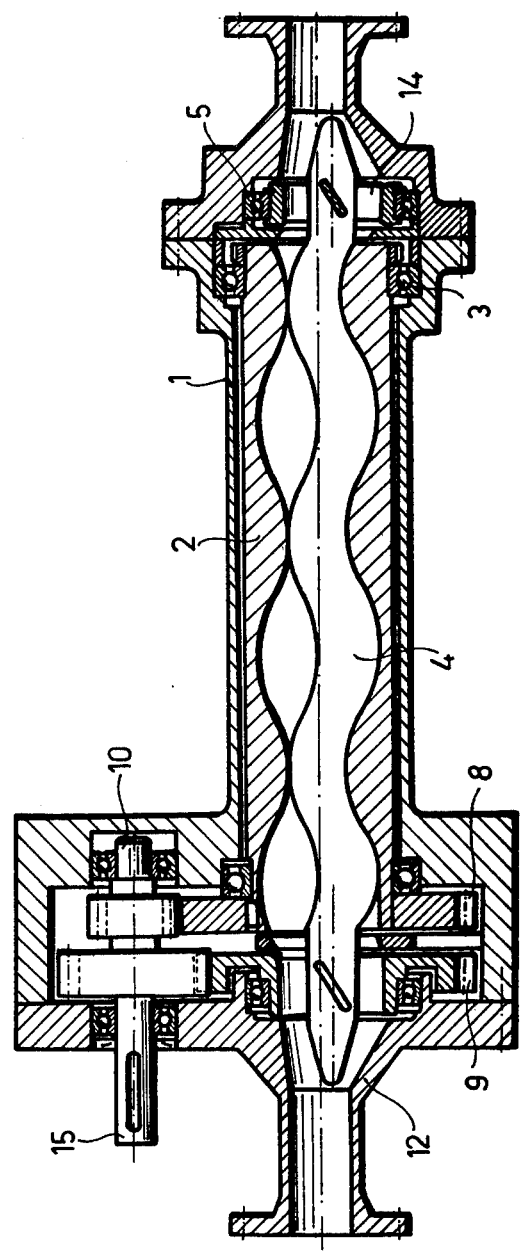
Figure 6:
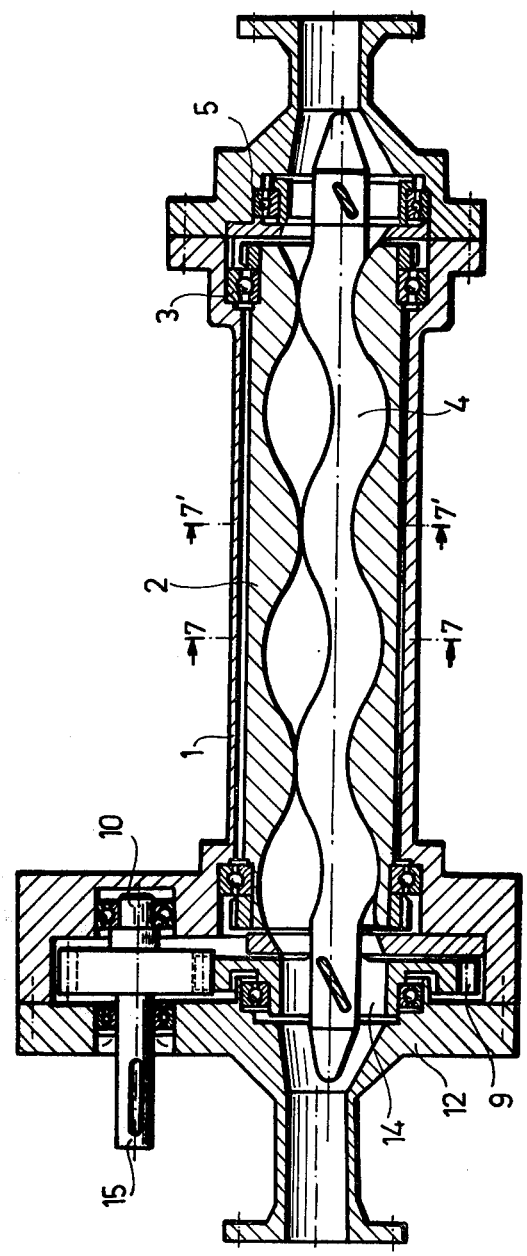
Figure 7:
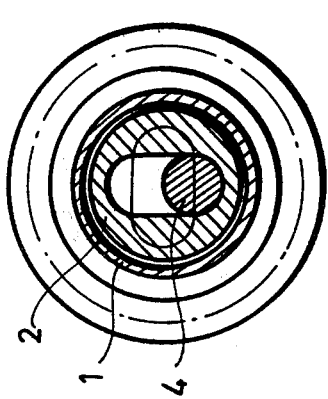

The FIG. 1 shows the equipment with single thread chamber and with double thread spindle, in longitudinal section.

the FIG. 2 is the transverse section according to 2—2, on the FIG. 1 the FIG. 3 shows the transverse section according to 3—3 on the FIG. 1 with the section according to 3'—3' with fine line;

the FIG. 4 shows the equipment with impulse maker, in longitudinal section, the FIG. 5 represents the equipment with double thread chamber and single thread spindle, in longitudinal section, the FIG. 6 represents a similar equipment to the equipment according to the FIG. 5, without a cogwheel, which rotates the chamber, in longitudinal section, finally the FIG. 7 shows the transverse section according to line 7—7 on the FIG. 6, with the section according to 7'—7', drawn with fine line.

The FIG. 1 represents the construction of the equipment according to the invention, which can be utilized favourably as pump, hydraulic motor, compressor or gas-engine.

The shaft-bearing (3)—which supports the single-arched slinglike epicycloid section chamber (2) and the shaft-bearing (3)—which supports the ellipse-section spindle (4)—are connected rigidly to the casing (1)—dimensioned for the effective pressure of the equipment-,—by the shaft-bearing (5), the guide cone (6) and the streamlined bearing bar (7). The gear rim (8)—which rotates with the chamber (2)—and the gear rim (9)—which rotates with the spindle (4) ensures the coordinated rotation of the chamber (2) and the spindle (4) by the two gear—which are fixed on the countershaft (10).

The transition piece (11) rotates together with the chamber (2), which ensures the favourable flow-conditions between the ring formed reduced opening (12) and the epicycloid opening of the chamber (2). The spindle-neck (13), which rotates together with the spindle (4) ensures the favourable flow-conditions between the ellipse-section of the guide cone (6) and the spindle (4).

The spindle neck (13) and the gear rim (9) are connected by the blades (14). The pitch of the blades (14), is necessary for the decrease of the flow resistance between the medium—which progresses in axis-direction—and the rotating blades (14).

The stub-axle (15) of the countershaft (10) is used for the receipt of transmitting of the mechanical work in consequence of the destimation of equipment.

The FIG. 4 shows the equipment according to the invention, which can be used as flow-meter.

At this forming gear (16) with number of teeth "z" and the internal toothed gear (17) with number of teeth "2z" engage between the single thread chamber (2) and the spindle (4). The gear (16) supported bearing the axis (19) and the transition piece (11) are connected by the blades (18). The spindle (4) together with the internal toothed gear (17) is setted on the pivot (20). The impulse-maker such as a conventional optical pulse generator—which includes the sensors (22) and the disc (21) arranged with a transition piece (11) on it—is used for the sons-right remote signalling of changes which are proportional with the volume of the flowing medium.

The FIG. 5 represents the construction of the equipment with circular section single thread spindle and with double thread internal threaded chamber, which can be utilized favourably as pump, compressor or extruder.

The necessary modification $i = n_k/n_o = 0.5$ between the chamber (2) and the spindle (4) is ensured by the gears, which are setted on the countershaft (10) and drive the chamber (2) and the spindle (4).

The FIG. 6 and FIG. 7 show similar equipment, as on the FIG. 5. At this form alone the profile of the sections ensure an interlocking between the chamber (2) and the spindle (4).

The operating of the above alleged equipment follows from the construction. If a kinetic or pressure energy supporting medium flows through the chamber, a machine can be driven from the output shaft, which is in interlocking with the spindle by the gears; and the other way round: the working capacity of the flowing medium can be increased connecting the stub axle with a drive and a favourable machine.

The equipment is suitable to use for example: as liquid-pump, plastic-extruder, jet-gear, compressor ventilator or gas-exhauster, hydromotor, gas-engine, further flow-meter, flow-gas-volumeter near favourable form and measuring, perhaps completing with other needful, which are in itself well-known.

What we claim is:

1. In a multi-purpose flow apparatus of the type which operates on the principle of volumetric displacement, the improvement comprising a casing having an inlet and an outlet disposed along a given line, an internally helicoidal chamber member rotatable about its center of gravity parallel to the given line and having $z_k$ thread starts: an externally helicoidal spindle, and means mounting the spindle for rotation about an axis disposed at its center of gravity and parallel to the given line and comprising bearings and a fluid fluid flow guide cone for each bearing at the inlet and the outlet, wherein the spindle has $z_o = z_{k+1}$ thread starts, the thread division thereof is $z_o/z_k$ times pitch of the chamber member and the angular velocity of rotation of the spindle is $z_k/z_o$ times that of the chamber member.

2. The apparatus according to claim 1, wherein the internal section of the transverse profile of the chamber member is a regular single arch hooked epicycloid without the inner arc, and the internal section of the external envelope of the surface arising from the relative movement of the spindle is a regular single arch hooked epicycloid without the internal arc.

3. The apparatus according to claim 1, wherein the internal section of the transverse profile of the chamber member is a spiral epicycloid and the internal section of the external envelope of the surface arising from the relative movement of the spindle is a spiral epicycloid.

4. The apparatus according to claim 1, wherein the chamber member has a constant pitch.

5. The apparatus according to claim 1, wherein the chamber member has a variable pitch.

* * * * *